United States Patent
Kloetzer et al.

(10) Patent No.: US 10,724,570 B2
(45) Date of Patent: Jul. 28, 2020

(54) FASTENING ASSEMBLY

(71) Applicant: MTU Aero Engines AG, Munich (DE)

(72) Inventors: Alexander Kloetzer, Fuerstenfeldbruck (DE); Manfred Feldmann, Eichenau (DE)

(73) Assignee: MTU AERO ENGINES AG, Munich (DE)

( * ) Notice: Subject to any disclaimer, the term of this patent is extended or adjusted under 35 U.S.C. 154(b) by 626 days.

(21) Appl. No.: 15/373,100

(22) Filed: Dec. 8, 2016

(65) Prior Publication Data

US 2017/0167522 A1 Jun. 15, 2017

(30) Foreign Application Priority Data

Dec. 15, 2015 (EP) ..................... 15199984

(51) Int. Cl.
| | |
|---|---|
| *F16B 39/00* | (2006.01) |
| *F16B 35/06* | (2006.01) |
| *F01D 5/02* | (2006.01) |
| *F01D 25/16* | (2006.01) |
| *F01D 25/24* | (2006.01) |
| *F04D 29/056* | (2006.01) |
| *F04D 29/32* | (2006.01) |
| *F04D 29/52* | (2006.01) |
| *F16B 35/00* | (2006.01) |

(52) U.S. Cl.
CPC ............... *F16B 35/06* (2013.01); *F01D 5/02* (2013.01); *F01D 25/162* (2013.01); *F01D 25/243* (2013.01); *F04D 29/056* (2013.01); *F04D 29/321* (2013.01); *F04D 29/522* (2013.01); *F16B 35/005* (2013.01); *F05D 2220/32* (2013.01); *F05D 2230/60* (2013.01)

(58) Field of Classification Search
CPC ............. F16B 2200/509; F01D 25/243; F05D 2260/31; F05D 2260/36
USPC .......................................... 411/107; 415/189
See application file for complete search history.

(56) References Cited

U.S. PATENT DOCUMENTS

| | | | | |
|---|---|---|---|---|
| 3,906,552 | A * | 9/1975 | Weber ................... | A61F 2/6607 623/47 |
| 4,511,023 | A * | 4/1985 | Nagai ................ | A01D 34/6812 192/18 R |
| 4,747,737 | A * | 5/1988 | Roffelsen ................ | F16B 19/02 248/316.3 |
| 4,777,887 | A * | 10/1988 | Thudt ....................... | B61F 9/00 104/247 |
| 4,990,056 | A * | 2/1991 | McClain ............... | F01D 11/001 29/889.22 |
| 6,293,600 | B1 * | 9/2001 | Lecourt ..................... | B66C 1/66 294/215 |

(Continued)

FOREIGN PATENT DOCUMENTS

| | | |
|---|---|---|
| EP | 1598566 | 11/2005 |
| EP | 1717481 | 11/2006 |

(Continued)

*Primary Examiner* — Gary W Estremsky
(74) *Attorney, Agent, or Firm* — Davidson, Davidson & Kappel, LLC

(57) ABSTRACT

A fastening assembly having a component flange (10), in particular of a turbomachine, having at least one bore (11) in which a sleeve (30) is placed that extends through a bolt (20) which has a head (21) that is axially secured between a rim (12) of the bore and a component flange-mounted axial limit stop (13).

19 Claims, 2 Drawing Sheets

(56) References Cited

U.S. PATENT DOCUMENTS

| | | | | |
|---|---|---|---|---|
| 6,481,971 B1* | 11/2002 | Forrester | | F01D 5/323 |
| | | | | 416/221 |
| 6,561,763 B2* | 5/2003 | Breakwell | | B64C 11/14 |
| | | | | 416/245 R |
| 6,632,056 B1* | 10/2003 | Lind | | E04F 13/0816 |
| | | | | 403/282 |
| 6,860,686 B2* | 3/2005 | Schneider | | F16B 33/004 |
| | | | | 403/297 |
| 6,914,721 B2* | 7/2005 | Deverin | | G02B 21/0012 |
| | | | | 359/368 |
| 6,938,385 B2* | 9/2005 | Lind | | B32B 17/10293 |
| | | | | 52/204.7 |
| 7,261,489 B2 | 8/2007 | Arbona et al. | | |
| 7,491,031 B2 | 2/2009 | Brault et al. | | |
| 9,062,701 B2 | 6/2015 | Hyatt | | |
| 2002/0050108 A1* | 5/2002 | Kreyenborg | | E04F 13/0855 |
| | | | | 52/306 |
| 2005/0117966 A1* | 6/2005 | Steinbeck | | F16B 5/025 |
| | | | | 403/408.1 |
| 2008/0053214 A1* | 3/2008 | Chen | | G01P 5/06 |
| | | | | 73/170.05 |
| 2009/0014930 A1* | 1/2009 | Kuzukawa | | F16F 13/10 |
| | | | | 267/140.13 |
| 2012/0274092 A1* | 11/2012 | Yue | | B60J 7/141 |
| | | | | 296/100.07 |
| 2013/0309078 A1* | 11/2013 | Vo | | F01D 9/04 |
| | | | | 415/208.1 |
| 2015/0219145 A1* | 8/2015 | Lambert | | F16B 43/001 |
| | | | | 411/369 |
| 2015/0285285 A1* | 10/2015 | Burbach | | E04F 13/0816 |
| | | | | 411/107 |

FOREIGN PATENT DOCUMENTS

| | | |
|---|---|---|
| EP | 2543828 | 1/2013 |
| WO | WO2014/149350 | 9/2014 |

* cited by examiner

FASTENING ASSEMBLY

This claims the benefit of European Patent Application EP 151 999 84.4, filed Dec. 15, 2015 and hereby incorporated by reference herein.

The present invention relates to a fastening assembly having a component flange, in particular of a turbomachine, as well as to a method for assembling the fastening assembly.

BACKGROUND

When working with turbomachines, in particular, stay bolts, whose head is screwed into a component flange, are often used for assembly or fastening.

SUMMARY OF THE INVENTION

It is an object of an embodiment of the present invention to improve the fastening, respectively assembly of a component flange, in particular of a turbomachine.

In an embodiment of the present invention, a fastening assembly has an, in particular annular projection-type component flange.

In an embodiment, the component flange may belong to a turbomachine, in particular a gas turbine, in particular of an aircraft engine. In another embodiment, the component flange is configured, in particular formed on a housing part, on a turbine or compressor disk, or on a, in particular supporting structural component of the turbomachine. For such component flanges, it is particularly advantageous to use a fastening (assembly) as described here.

In an embodiment of the present invention, the component flange has one or a plurality of bores, in particular through bores, distributed in particular longitudinally along a circumference, in particular equidistantly. In an embodiment, the one or plurality of through bores are (each) produced with the component flange by primary shaping or manufactured therein by removal of material, in particular by machining.

In accordance with one variant of the present invention, one or a plurality of, in particular, all of the bores (in each case at least) one bolt is inserted, respectively introduced and partially passed through, in particular in such a way that the inserted bolt projects out of the particular bore on both sides.

One variant of the present invention provides that a sleeve be placed in each instance in the bore prior to, simultaneously with, or subsequently to the insertion of the (particular) bolt, so that once the bolt, which has been inserted through the bore, has been passed through and configured, it (also) extends through the sleeve that is placed in the bore. By first inserting the bolt through the bore, and only then placing the sleeve in the bore, the advantage is derived that an assembly may be accomplished even under narrow spatial conditions. Thus, in particular, the bolt may be introduced at an angle into the bore and, in this manner, moved past the axial limit stop. The sleeve subsequently locks the end position of the bolt, at least circumferentially and in the radial direction.

Thus in one variant, in particular, the bolt is initially passed through the (sleeve-free) bore, and the sleeve is subsequently placed in the bore, so that the bolt, which already extends through the bore, (also now) extends through the sleeve. Not as preferred, but likewise conceivable, at least when sufficient space is available, is that the sleeve initially be placed in the (bolt-free) bore, and that the bolt be subsequently passed through the sleeve and consequently also through the bore. In another variant, the bolt and the sleeve may also be introduced simultaneously into the bore.

In another embodiment, the bolt and sleeve may also be introduced into the bore from opposite sides. This may hereby improve the assembly, especially in one variant.

In one variant of the present invention, the bolt features an, in particular radially projecting head, that is axially secured between a rim of the bore and a component flange-mounted axial limit stop, in particular with or without an axial gap between the head and the rim of the bore and/or the limit stop and/or form-fittingly and/or directly or indirectly by one or a plurality of intermediate elements, in particular washers or the like, through the rim, respectively a wall of the component flange surrounding the same, and/or the limit stop, particularly when the bolt extends through the sleeve placed in the bore, particularly only when the bolt extends through the sleeve placed in the bore. "Axial" and "radial" refer here, in particular, to a (longitudinal) axis of the bolt, respectively to an axis of the bore, respectively sleeve.

In one variant, the axial limit stop makes it possible to captively secure the bolt, in particular, up to and/or during a tensioning thereof, in particular by a mating holder explained in the following and, in particular, thereby facilitate the assembly.

In one variant, a securing process that includes an axial gap may advantageously facilitate the assembly of the bolt and/or the disassembly, and/or compensate for manufacturing and/or assembly tolerances and/or thermal deformations. In one variant, a securing process that does not include an axial gap, respectively an axial securing without (axial) clearance may, in particular, frictionally lock the bolt in position and, in this manner, in particular facilitate the assembly of the mating holder.

In one variant, the sleeve may radially center the bolt, in particular in a radial position in which the head is axially secured between the rim of the bore and the axial limit stop. In one variant, this makes it advantageously possible to facilitate the assembly and/or disassembly and/or manufacturing and/or assembly tolerances.

In one variant, the axial limit stop is joined to the component flange in a manner that does not permit non-destructive detachment, in particular, is joined in a material-to-material bond, or integrally formed therewith, and/or, together with an opposite bore-side flange wall, defines a groove into which the head engages radially. In a further refinement, the head is axially secured in this, respectively by this groove with or without an axial gap, in particular with a clearance or press fit, in particular form-fittingly and/or directly by the axially opposing groove sides or groove walls or indirectly by one or a plurality of intermediate elements, in particular washers or the like that are each axially configured between the head and one or both groove wall(s) or groove flank(s).

In one variant, the limit stop design, in particular a, respectively the strength may be improved by an integral formation with the component flange, by joining the axial limit stop to the component flange in a manner that does not permit non-destructive detachment.

In one variant, the axial limit stop is formed or provided only in the area of the associated bore, in particular in the form of a freestanding radial projection or the like. This makes it possible, in particular to economize on material. In another variant, the axial limit stop may also be formed by a circumferentially extending annular projection.

The structural design of the fastening assembly in one variant is such that an axial width of the groove is smaller than an axial distance between the head, in particular of a bore-side end face of the head, and an end face of the bolt facing away from the head. The limit stop may hereby advantageously axially secure the bolt, respectively head, form-fittingly.

Additionally or alternatively, the (structural) design of the fastening assembly in one variant is such that an outer contour of the head of the bolt partially covers an outer contour of the axial limit stop in at least one rotational or angular position of the bolt about the (longitudinal) axis thereof, respectively the axial projections of the two outer contours mutually intersect when the bolt extends through the sleeve placed in the bore. The limit stop may hereby advantageously axially secure the bolt, respectively head, form-fittingly.

In another embodiment, the (structural) design of the fastening assembly is such that the outer contour of the head at least partially covers the axial limit stop in each rotational or angular position of the bolt about the (longitudinal) axis thereof, respectively the axial projections of the two outer contours mutually intersect when the bolt extends through the sleeve placed in the bore. The limit stop may hereby advantageously axially secure the bolt, respectively head, form-fittingly.

In an alternative, less preferred embodiment, the (structural) design of the fastening assembly is such that the outer contour of the head does not cover the axial limit stop in at least one other rotational or angular position of the bolt about the (longitudinal) axis thereof, respectively the axial projections of the two outer contours do not mutually intersect when the bolt extends through the sleeve placed in the bore. This makes it possible to subsequently axially secure the bolt, respectively head in the other rotational position by rotation about the (longitudinal) axis, when inserted concentrically, whereby the (longitudinal) axes of the bolt and of the bore mutually align, thereby passing the limit stop in the one rotational position.

Correspondingly, one variant provides that the head be axially secured between the rim of the bore and the axial limit stop by rotation about the axis thereof upon insertion of the bolt, in particular rotated into the groove, in particular prior to or subsequently to the placement of the sleeve in the bore.

In particular, when the outer contour of the head of the bolt, which extends through the sleeve placed in the bore, at least partially covers the outer contour of the axial limit stop in each rotational or angular position; in one variant, the head is thereby axially secured between the rim of the bore and the axial limit stop by a, respectively the centering of the bolt in the bore, upon insertion of the bolt through the sleeve-free bore, in that the sleeve is placed in the bore, through which the bolt is already inserted, and thereby centers the bolt. Thus, in one variant, the bolt may be inserted through the sleeve-free bore, initially parallel to the bore axis, however, with axial offset, radially away from the axial shoulder, and/or with a head that is tilted away from the axial shoulder, and subsequently centered by the placement of the sleeve in the bore, allowing it to extend through the sleeve, in particular with radial offset toward the axial shoulder, and thereby be axially secured by the same, in particular engage in the groove. Accordingly, in one variant, the (structural) design of the fastening assembly is such that the bolt is introducible into or passable through the sleeve-free bore only with axial offset, radially away from the axial limit stop, parallel to the bore axis, and/or with the head tilted away from the axial limit stop.

In one variant, an end portion of the bolt facing away from the head is joined, by frictional engagement, in a form-locking manner and/or in a material-to-material bond to a mating holder, in particular to a nut or another component (flange), in particular bolted thereto. In another embodiment, the bolt is hereby axially tensioned, respectively strained.

Thus, in one variant, the bolt may function analogously to a locking pin, however, without the manufacturing thereof being complicated by a bolted connection between the bolt and the component flange and/or weakening the same due to a notching effect.

Accordingly, in one variant, the bore is designed to be internal thread-free.

Another embodiment provides that the mating holder be axially braced, in particular directly or indirectly, by the sleeve, in particular on, respectively against the component flange. In other words, in the embodiment, the sleeve is placed by the mating holder in the force distribution induced by the bolt. In particular, in one variant, the sleeve may be clamped against the component flange by the bolt and the associated mating holder. In this context, one or a plurality of intermediate elements, in particular a mating component flange explained in the following, washers or the like, may be configured between the mating holder and the sleeve and/or between the sleeve and the component flange. Similarly, the sleeve may also directly contact the mating holder and/or the component flange. In one variant, this makes it possible for the sleeve to be advantageously frictionally engaged.

In another embodiment, the mating holder is not axially braced by the sleeve. In other words, in this embodiment, the sleeve is not placed in the force distribution induced by the tensioning of the bolt by the mating holder. In particular, in an embodiment, the sleeve may be configured to be axially movable, respectively with axial play between the mating holder and the component flange. In an embodiment, this makes it advantageously possible to compensate for manufacturing and/or assembly tolerances and/or thermal deformations.

In an embodiment, the mating component flange is joined to the component flange in particular in a manner that does not permit non-destructive detachment, in that the or one or a plurality, in particular all of the bolts extend in each case through (at least) one further bore in the mating component flange; the mating component flange being axially configured between the component flange, in particular the sleeve(s) and the mating holder(s) and, in a further refinement, being tensioned by the bolt(s), respectively mating holder(s), in particular in that initially the bolt(s) is/are inserted through the further bore(s) and, subsequently braced by the mating holder(s), in particular bolted.

In an embodiment, the sleeve is joined, by frictional engagement, in a form-locking manner and/or in a material-to-material bond to the component flange and/or to the bolt, in particular bolted, or press-fitted into the bore and/or slipped onto the bolt. In an embodiment, this makes it possible to improve the assembly and/or disassembly.

Additionally or alternatively, in an embodiment, the sleeve is configured with or without radial clearance of motion in the bore and/or on the bolt. In an embodiment, a configuration having radial clearance of motion makes it advantageously possible to compensate for manufacturing and/or assembly tolerances and/or thermal deformations. In an embodiment, a configuration without radial clearance of motion makes it possible to improve the assembly and/or disassembly.

In an embodiment, the sleeve has an annular projection that braces it axially against the component flange, in particular of a side opposite the head of the bolt. In an embodiment, this makes it possible to improve the assembly and/or disassembly.

In an embodiment, the sleeve placed in the bore thus projects out of the bore, in particular on a side of the component flange facing away from the (bolt) head. Additionally or alternatively, in an embodiment, the head of the bolt, in particular in an (assembly) state tensioned by the mating holder, is braced directly or via one or a plurality of intermediate elements, such as washers or the like, against the bore-side flange wall.

In another embodiment, the head has an angular, in particular a triangular, square, pentagonal, hexagonal, octagonal or polygonal outer contour; in another embodiment, a circular outer contour. However, a circular outer contour is not as preferred because it does not provide any protection against rotation.

BRIEF DESCRIPTION OF THE DRAWINGS

Further advantageous embodiments of the present invention will become apparent from the dependent claims and the following description of preferred embodiments. To this end, the drawing shows, partly in schematic form, in:

DETAILED DESCRIPTION

Figure 1:
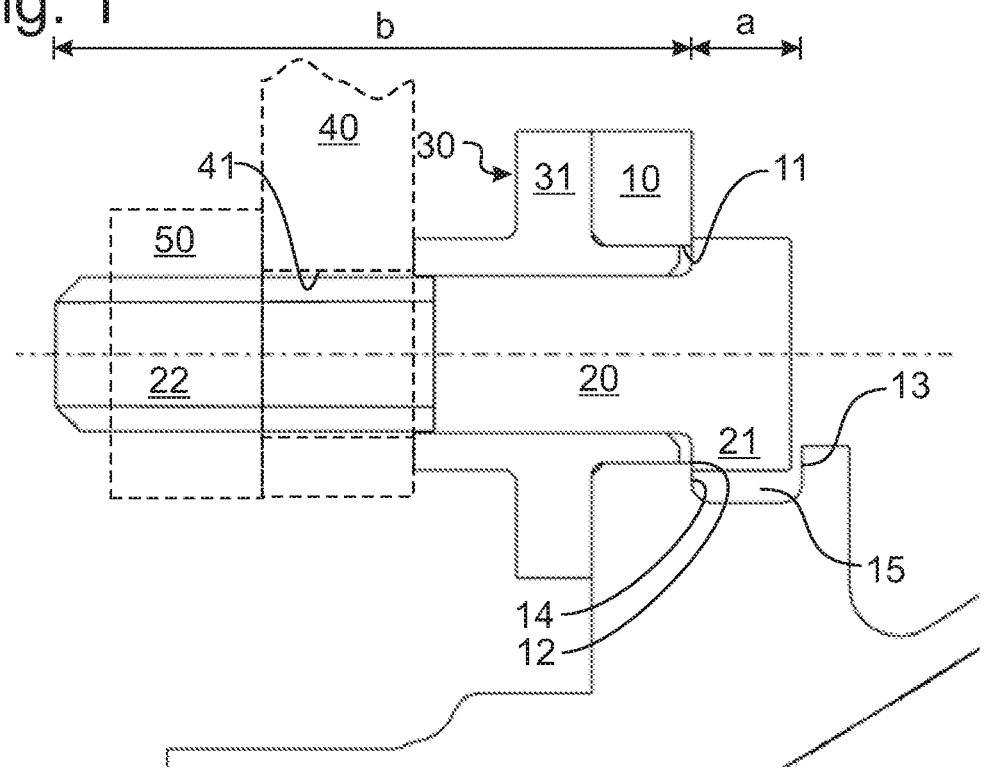
FIG. 1: a portion of a fastening assembly in accordance with an embodiment of the present invention in a sectional view.
Figure 2:
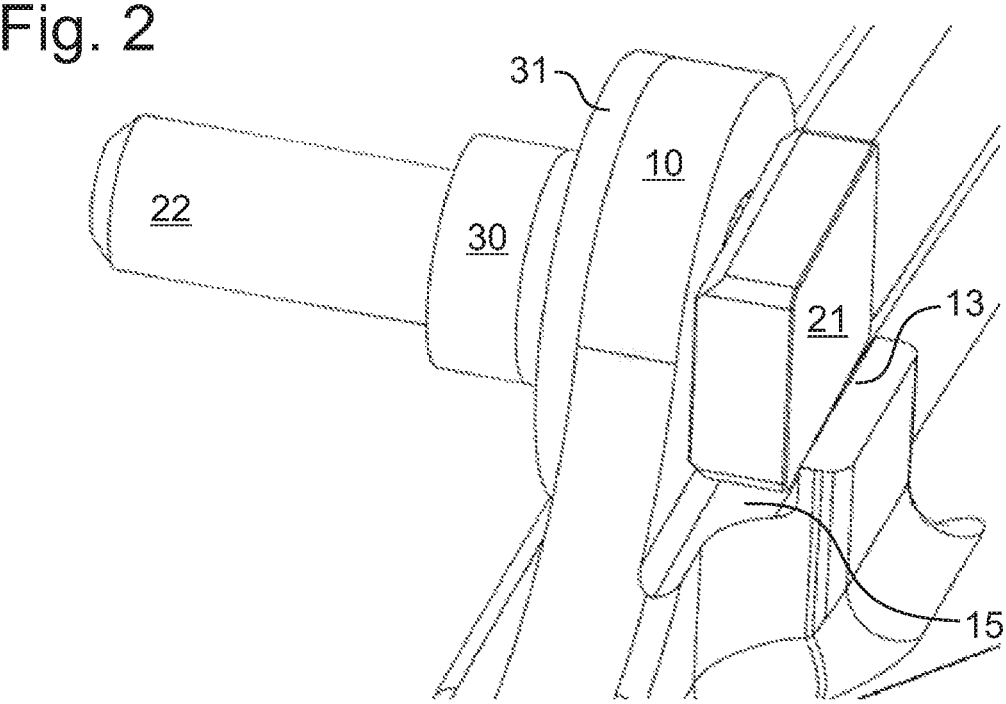
FIG. 2: the portion of the fastening assembly in a perspective view.

FIG. 1 shows a portion of a fastening assembly including a component flange 10 in accordance with one embodiment of the present invention in a cross section; FIG. 2 the portion of the fastening assembly in a perspective view.

Figure 3:
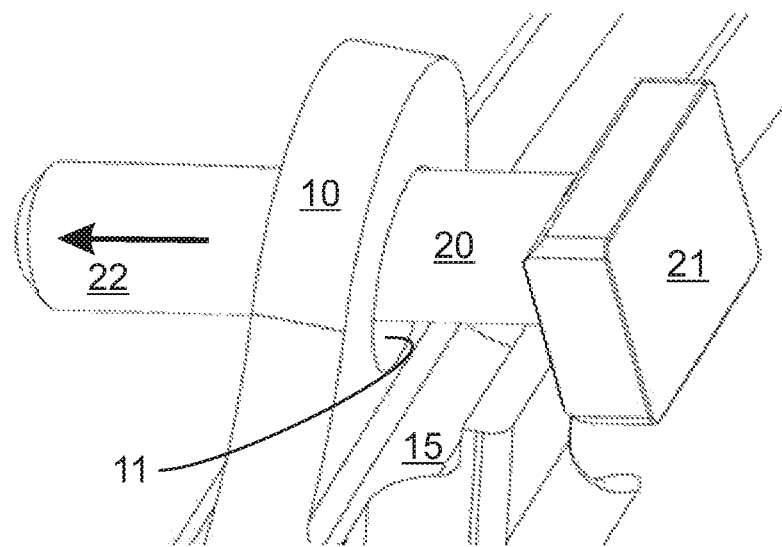
FIG. 3: a step of a method for assembling the fastening assembly in accordance with an embodiment of the present invention.

FIG. 3, 4 show two steps of a method for assembling the fastening assembly in accordance with an embodiment of the present invention.

Component flange 10 has at least one through bore 11 disposed in the detail view of FIGS. 1-4.

A bolt 20 is inserted therethrough, as indicated in FIG. 3 by a motion arrow. Bolt 20 has a head 21.

In this context, bolt 20, in particular head 21 thereof, bore 11 and axial limit stop 13, as is especially apparent in FIG. 1, are structurally designed to allow bolt 20 to only be introduced eccentrically into sleeve-free bore 11 and be inserted therethrough; the (longitudinal) axis of bolt 20 being radially offset away from axial shoulder 13 (upwardly in FIG. 1) parallel to the (longitudinal) axis of bore 11, and upon insertion, head 21 passes axial limit stop 13.

Figure 4:
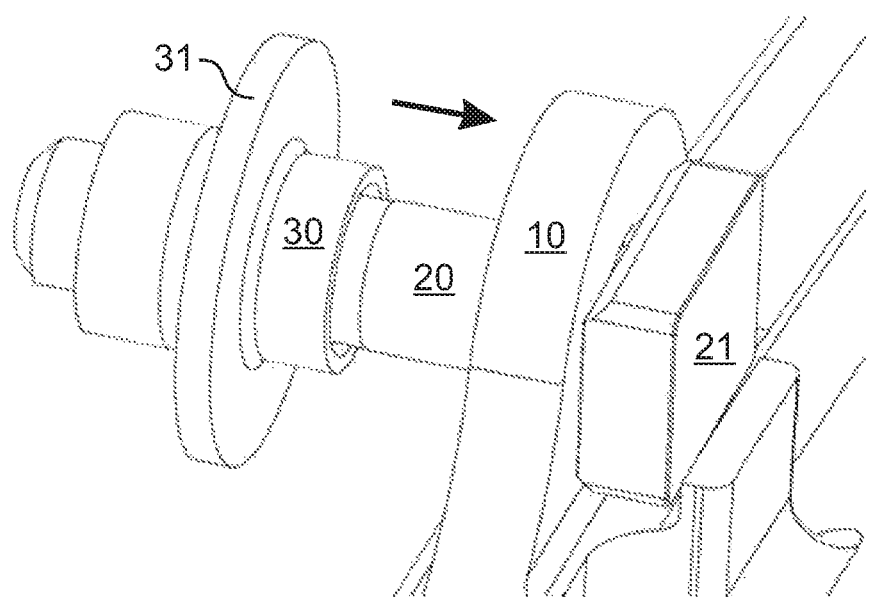
FIG. 4 another step of the method.

A sleeve 30 is subsequently placed in bore 10, as indicated in FIG. 4 by a motion arrow, so that, following insertion and placement, bolt 20, which has been inserted through bore 11, (also) extends through sleeve 30 placed in bore 11.

Sleeve 30 hereby centers bolt 20 radially in bore 11 (vertically downwardly in FIG. 1). Head 21 is axially secured between a rim 12 of bore 11 and a component flange-mounted axial limit stop 13 that is integrally formed with component flange 10 and, together with an opposite bore-side flange wall 14, defines a groove 15, into which head 21 engages radially and is thereby axially secured.

A mating component flange 40 indicated by a dashed line and partially only in FIG. 1 may subsequently be non-destructively detachably joined to component flange 10, in that bolt 20 extends through another bore 41 in mating component flange 40 and bolts an end portion 22 of bolt 20 facing away from the head to a mating holder in the form of a nut 50 indicated by a dashed line, likewise only in FIG. 1, and is hereby axially tensioned, respectively strained, so that mating component flange 40 is axially configured between component flange 10, in particular sleeve 30, and nut 50, and is tensioned by bolt 20.

In the exemplary embodiment, the mating holder in the form of nut 50 is axially braced by mating component flange 40 and sleeve 30 on or against component flange 10, so that sleeve 30 is placed in the force distribution induced by the tensioning of bolt 10 by mating holder 50.

Sleeve 30 has an annular projection 31 via which it is axially braced against component flange 10.

Although exemplary embodiments were explained in the preceding description, it should be noted that many modifications are possible.

Thus, in FIGS. 1-4, in particular, only one bolt 20 is shown. It is understood that other bolts distributed in the circumferential direction of component flange 10 are, respectively may be analogously provided, in particular extend through corresponding bores and sleeves and be, respectively be able to be threadedly bolted by nuts.

In one modification, (end portion 22 of) bolt 20 may also be bolted directly by, respectively in mating component flange 40, in particular by an internal thread of bore 41, instead of via nut(s) 50.

It should also be appreciated that the exemplary embodiments are merely examples, and are in no way intended to restrict the scope of protection, the uses, or the design. Rather, the foregoing description provides one skilled in the art with a guideline for realizing at least one exemplary embodiment, it being possible for various modifications to be made, particularly with regard to the function and configuration of the described components, without departing from the scope of protection as is derived from the claims and the combinations of features equivalent thereto.

LIST OF REFERENCE NUMERALS 10 component flange
11 bore
12 rim of the bore
13 axial limit stop
14 flange wall
15 groove
20 bolt
21 head
22 end portion
30 sleeve
31 annular projection
40 mating component flange
41 further bore
50 nut (mating holder)
a axial width of the groove
b axial distance between the head and the end face of the bolt facing away therefrom

What is claimed is:

1. A fastening assembly comprising:
   a component flange having at least one bore;
   a sleeve placed in the bore;
   a bolt extending through the sleeve, the bolt having a head axially secured between a rim of the bore and a component flange-mounted axial limit stop fixed with respect to the component flange;
   wherein the sleeve is joined, by frictional engagement, in a form-locking manner or in a material-to-material bond to the component flange or to the bolt or is placed with or without radial clearance of motion in the bore or on the bolt;
   wherein the component flange is configured on a housing part of a gas turbine, on a turbine disk or compressor disk of the gas turbine, or on a structural component of the gas turbine;
   wherein the fastening assembly is configured as part of the gas turbine, the gas turbine being a turbomachine.

2. The fastening assembly as recited in claim 1 wherein the axial limit stop is joined to the component flange in a manner that does not permit non-destructive detachment, or is integrally formed therewith, or, together with a bore-side flange wall defines a groove, the head engaging radially in the groove.

3. The fastening assembly as recited in claim 1 wherein the axial limit stop together with a bore-side flange wall defines a groove, the head engaging radially in the groove and an axial width of the groove is smaller than an axial distance between the head and an end face of the bolt facing away from the head.

4. The fastening assembly as recited in claim 1 wherein, in at least one rotational position of the bolt, an outer contour of the head at least partially covers an outer contour of the axial limit stop.

5. The fastening assembly as recited in claim 4 wherein, in every rotational position of the bolt, the outer contour of the head at least partially covers the outer contour of the axial limit stop; or in at least one other rotational position of the bolt, does not cover outer contour of the axial limit stop.

6. The fastening assembly as recited in claim 1 wherein an end portion of the bolt facing away from the head is joined by frictional engagement, in a form-locking manner or in a material-to-material bond to a mating holder.

7. The fastening assembly as recited in claim 1 wherein an end portion of the bolt facing away from the head is bolted to a mating holder.

8. The fastening assembly as recited in claim 6 wherein the mating holder is axially braced against the component flange.

9. The fastening assembly as recited in claim 1 further comprising a mating component flange having at least one further bore, the bolt extends through the at least one further bore; the mating component flange being axially configured between the component flange and a mating holder.

10. The fastening assembly as recited in claim 9 wherein mating component flange is tensioned by the bolt.

11. The fastening assembly as recited in claim 1 wherein the sleeve is bolted to the component flange.

12. The fastening assembly as recited in claim 1 wherein the fastening element is configured on a bearing structural component of the turbomachine.

13. The fastening assembly as recited in claim 1 wherein the axial limit stop is integrally formed with the component flange.

14. A method for assembling a fastening assembly as recited in claim 1, comprising the steps of:
    passing the at least one bolt through the bore of the component flange; and
    placing the sleeve in the bore in advance, simultaneously or subsequently;
    the bolt, which has been passed through the bore, extending through the sleeve placed in the bore, and the head of the bolt being axially secured between a rim of the bore and the component flange-mounted axial limit stop.

15. The method as recited in claim 14 wherein, upon passing of the bolt through the bore, the head is axially secured by the sleeve between the rim of the bore and the axial limit stop by rotation about the axis thereof or centering of the bolt in the bore.

16. The method as recited in claim 14 wherein an end portion of the bolt facing away from the head is joined by frictional engagement, in a form-locking manner or in a material-to-material bond or bolted to a mating holder.

17. The method as recited in claim 14 wherein a mating component flange is axially configured between the component flange and the mating holder, the bolt extending through a further bore of the mating component flange.

18. The method as recited in claim 14 wherein the sleeve is joined, by frictional engagement, in a form-locking manner or in a material-to-material bond to the component flange or to the bolt, or configured with or without radial clearance of motion in the bore or on the bolt.

19. A fastening assembly comprising:
    a component flange having at least one bore;
    a sleeve placed in the bore;
    a bolt extending through the sleeve, the bolt having a head axially secured between a rim of the bore and a component flange-mounted axial limit stop fixed with respect to the component flange;
    wherein the sleeve is joined, by frictional engagement, in a form-locking manner or in a material-to-material bond to the component flange or to the bolt or is placed with or without radial clearance of motion in the bore or on the bolt;
    wherein the component flange is configured on a bearing structural component of a turbomachine.

* * * * *